Oct. 1, 1946.            H. A. LEVEY                 2,408,429
    SMOKE SCREEN COMPOSITION AND THE METHOD OF
       DEVELOPING SMOKE SCREENS THEREFROM
              Filed May 6, 1942
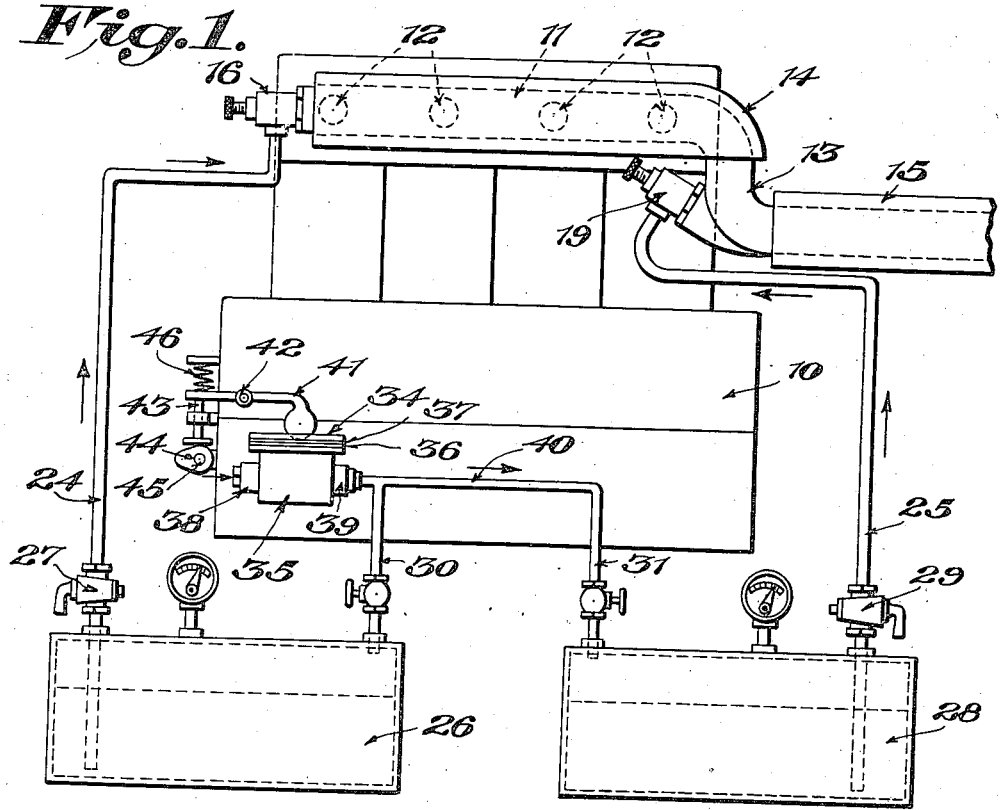
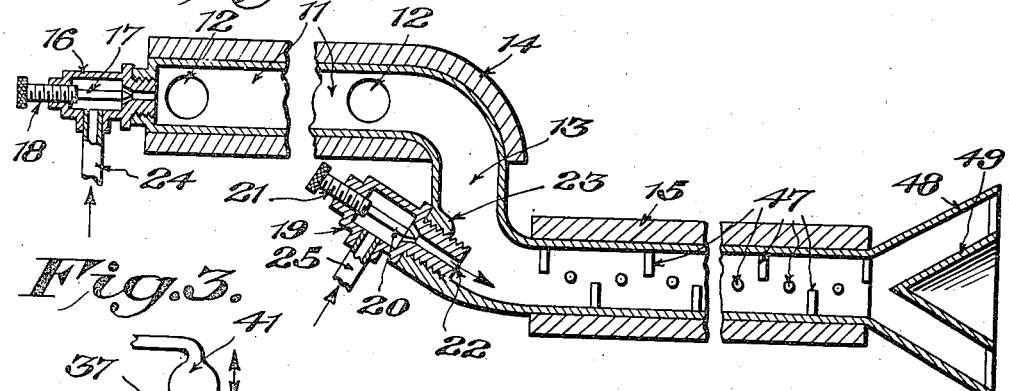
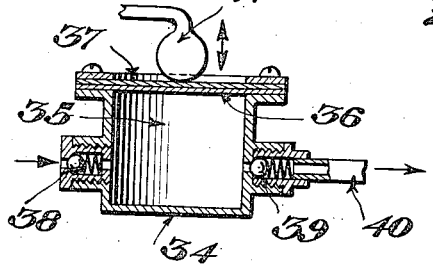
Inventor
Harold A. Levey, Patented Oct. 1, 1946

2,408,429

UNITED STATES PATENT OFFICE 2,408,429

SMOKE SCREEN COMPOSITION AND THE METHOD OF DEVELOPING SMOKE SCREENS THEREFROM

Harold A. Levey, New Orleans, La., assignor to Alonzo C. Patterson, New Orleans, La.

Application May 6, 1942, Serial No. 441,989

10 Claims. (Cl. 252—305)

1

The present invention is directed to smoke screen compositions and to the smoke screens produced therefrom, the latter being suitable for military, maritime, and peaceful purposes. The invention is also directed to a method of preparing the smoke screens.

In one aspect of the invention there is produced a smoke screen which is colored so that it will blend with objects dispersed on land or sea, including objects constituting elements of natural or artificial scenery.

In co-pending application, Serial No. 441,550, there is set forth a smoke screen composition adapted to produce a substantially white opaque smoke screen, said composition containing a liquid base material, as for example, a mineral oil or its equivalent, said base material being capable of vaporizing at a temperature varying between 300 to 800° F. without burning and condensing in the form of globules on contact with the atmosphere. In order to increase the opacity and density of the smoke screen produced by the composition described in said application, there is also incorporated in the composition dry particles of an organic or inorganic medium, as for example, a salt or compound, the latter being suspended in the base material, said dry particles being capable of imparting to the smoke screen generated from the composition an opacity and density which enables the smoke screen to hug the ground or article which it contacts, and which increases the longevity of the smoke screen. There is also present in said smoke screen composition a viscosity-inducing agent capable of maintaining said dry particles in suspension or dispersion in the smoke screen base material for relatively long periods of time and over varying temperature ranges.

It has been attempted to directly incorporate in said composition and equivalent compositions a coloring pigment, but these attempts have not been successful, since the coloring pigment does not function on generation of the smoke screen to color the same.

It has been discovered that when a coloring agent or constituent is incorporated directly in a smoke screen composition of the character above set forth, or directly into a smoke screen base such as lubricating oil in which there may be present a viscosity-inducing agent, the coloring constituent as, for example, a dry inert coloring pigment, is brought into physical contact with the globules of the vaporized smoke screen base as, for example lubricating oil, the latter forming the white cloud of a white smoke screen, and

2 that due to the contact of the particles of th pigment with the oil globules and the wetabilit factor of the oil or other equivalent smoke scree base, the surface tension factors will result i the pigment particles being fully wetted and in cluded within the surface of the smoke scree base globules. When this condition prevails, th resulting smoke cloud substantially completel loses its color value, and the pigment no longe functions as a coloring agent.

The further discovery has been made that i order for the pigment to function as a colorin agent in the smoke screen composition, it is nec essary that the pigment exist in the smoke scree generated from said composition in the form o dry isolated independently suspended particles.

It has also been discovered that it is necessar to first vaporize the smoke base as, for example a lubricating oil, and thereafter separately intro duce therein the pigmenting agent.

It has been further discovered that it is high ly desirable to introduce the particles of th coloring agent into a smoke screen apparatu adapted to produce a smoke screen as, for exam ple, the exhaust system of an internal combus tion engine, together with a volatile organic sol vent in which the coloring particles are inert an completely insoluble. As stated, these particles together with the volatile solvent and an agen preventing flocculation of said coloring particles is separately introduced in the smoke screen ap paratus after the initial basic cloud producin composition has been introduced into the appa ratus and has been volatilized and/or atomized The volatile solvent functions as a sustainin agent or vehicle to carry the coloring particle into vapors formed by heating and vaporizing th smoke screen base. The solvent should evaporate after discharge into the heated smoke screen ap paratus and leave no non-volatile gummy, tacky or similar residues which would otherwise resul in complete agglomeration and poor dispersior of the particles forming the pigmenting constitu ent of the smoke screen. It is highly desirable that the vehicle sustaining solvent be quickl volatilized after discharge of the composite color ing entity by spraying or atomization in the ex haust system of an internal combustion engine During the experiments which resulted in the present invention, it was discovered that there was a marked tendency for the coloring agents and/or coloring pigments to agglomerate in the smoke screen into large flocs on the evaporation of the volatile solvent vehicle. After considerable experimentation, it was discovered that it was necessary to have present in the coloring component an agent functioning to inhibit the clustering together or flocculation of the particles of the coloring agent or pigment. The preferred material which functions to inhibit floc formation of the coloring material or pigment is powdered graphite such as may be obtained by grinding flaked graphite, such as found in nature, to a high degree of fineness, or by utilizing finely divided graphite obtained by the Acheson electric furnace process. Other materials functioning in a similar manner include talc or soapstone, finely divided mica which is a representative of a silicate, and anhydrous boric acid.

In order to adequately set forth the present invention, it will be discussed in connection with the accompanying drawing, wherein:

Figure 1 is a partly diagrammatic view of an apparatus according to the present invention; and Fig. 2 is a section of an exhaust manifold and exhaust pipe showing the disposition of the feeding valves according to the present invention.

Fig. 3 is a section of the pump.

Referring to the figures of the drawing, and particularly Fig. 1 thereof, an internal combustion engine is indicated in general at 10 and includes an exhaust manifold 11, provided with the usual exhaust ports indicated in dotted lines at 12. Connected to the exhaust manifold in any suitable manner is an exhaust pipe 13. The exhaust manifold 11 and the exhaust pipe 13 is preferably insulated in order to conserve the heat of the gases passing therethrough, this insulation being indicated at 14 and 15. Obviously, any suitable insulation capable of withstanding temperatures in the neighborhood of 600 to 700° F. is suitable, such as asbestos, magnesium oxide, or magnesium carbonate, and it is to be understood that this insulation may be housed in a suitable housing or utilized in the form of premolded sections.

As shown in Fig. 2, a needle valve structure indicated in general at 16 is threaded into one end of the exhaust manifold. This needle valve includes a suitable valve stem 17 and adjusting screw 18. The valve stem 17 is provided with the usual conical shaped end and the valve casing with the usual seat. As shown, the needle valve structure 16 feeds into the exhaust manifold at the very beginning thereof. This positioning of the needle valve is preferable, since it is desirable in most instances that the smoke producing composition be fed into the exhaust manifold ahead of any of the ports so that the full heat of the exhaust gases will be utilized.

A second needle valve structure is indicated in general at 19, and is positioned at the outlet of the exhaust manifold so that additional smoke producing composition may be fed at this point. The needle valve structure 19 also includes a suitable valve stem 20 and an adjusting screw 21. It will be noted that the outlet of this second needle valve projects into the exhaust pipe at an angle of approximately 45°. It is important that the outlet of this second valve so projects that the outlet will be subjected to the sweeping action of the exhaust gases, and considerable turbulence will be created. Since the heat of the gases is somewhat less at this point, it is important that a complete atomization of the fluid fed into the exhaust pipe take place at this point and the angular positioning of the outlet of the needle valve 19 produces this effect. This outlet is indicated at 22. It will be noted that the outlet projects into the casing in this valve structure, as indicated at 23, and this projection insures the heating of the outlet, inasmuch as it is surrounded by flowing hot gases.

Referring once again to Fig. 1, it will be noted that the needle valves 16 and 19 are fed with fluid through the conduits 24 and 25. The conduit 24 communicates with the bottom of a tank 26. Interposed in the conduit 24 is a valve 27 which, in conjunction with the needle valve 16 serves to control the flow of fluid through the conduit 24 into the exhaust manifold. The conduit 25 similarly opens into the bottom of a tank 28 and a valve 29 is interposed in the conduit 25 to regulate the flow therethrough. The tanks 26 and 28 are each adapted to contain a suitable smoke producing composition.

The feed of liquid from the tanks 26 and 28 is effected under the influence of compressed air which is supplied to the tanks 26 and 28 through the conduits 30 and 31. Valves 32 and 33 are provided to vary the amount of compressed air fed. The two conduits 30 and 31 are connected to the outlet of a diaphragm type pump indicated in general at 34. As shown in Fig. 3, this pump includes a main chamber 35 covered by a leather diaphragm 36 and a flexible metal diaphragm 37. As the composite diaphragm structure is flexed inwardly and outwardly, air within the chamber 35 is compressed. Ball valves 38 and 39 are also provided which produce a flow of air out of the chamber 35 in the direction as indicated by the arrow 40. The metal diaphragm 37 is moved inwardly and outwardly by rocker arm 41. As shown in Fig. 1, the rocker arm 41 is pivoted at 42 on the engine block and rests on a push rod 43 at one end. A cam 44 reciprocates the push rod, said cam being rotatable with a suitable shaft 45 which may be driven from the engine crank shaft or any other moving portion of the engine 10. A spring 46 is also provided to move the rocker arm 41 back after the cam 44 and push rod 43 have moved the same in one direction.

As shown in Figure 2, a straight portion of the exhaust pipe 13 is provided with projecting pins 47 which form a network through which the smoke composition is vented. These pins or network are made of metal or other heat conducting substance, and serve to transmit the heat of the exhaust pipe to the smoke screen mixture flowing through the interior of the pipe. It is to be understood that in place of the metal pins, fins or plates of metal may be fastened on the interior of the pipe in order to admix and heat the gases flowing therethrough. It is to be noted further that this section of pipe is insulated, as indicated at 15 in order to conserve the heat therein. The outlet of the exhaust pipe is flared, as shown at 48, and an interior cone is provided, as indicated at 49 in order to form an outlet capable of distributing the smoke over the widest possible area. In place of the flared orifice shown, a series of concentric rings or funnels may be used to more evenly distribute the smoke formed.

There may be present in the tank 26 a composition comprising lubricating oil 87%, sodium stearate .5%, and dry ammonium chloride crystals 12.5%. If desired, the ammonium chloride crystals may be omitted and reliance be placed upon the pigment component introduced from tank 28 to impart to the smoke screen the desired opacity and density. Any of the compositions disclosed in co-pending application, Serial No. 441,550, may be fed from tank 26 into the exhaust manifold. In tank 28, the color pigmenting component may contain 11% carbon black, 8% graphite, 80% solvent naphtha, and 1% of aluminum stearate. The carbon black is an example of the pigmenting material, and the graphite is an example of material inhibiting clustering together or flocculation of the carbon black. The aluminum stearate is a representative of a suitable dispersion agent for the coloring composition present in tank 28.

It is to be noted that the basic screen forming composition is introduced at one point of the manifold which is usually the hottest portion and at a remote portion there is introduced into the exhaust manifold the coloring composition. It is quite necessary that the coloring composition only contact the basic screen composition after the smoke producing base thereof as, for example, lubricating oil has been completely vaporized or gasified. This procedure avoids the particles of the coloring agent from being wetted by the particles of the smoke screen base. It is clear from the above, therefore, that the pigmenting composition is not mixed with the screen forming composition containing the fluid base until after the latter has been subjected to heat treatment. The exhaust system of an automotive engine generates adequate heat on one hand and discharges a substantial volume of mixed gases for satisfactory dispersion. The procedure above set forth enables the pigmenting particles to be well mixed with the particles or globules of the vaporized composition producing the usual opaque white smoke screen. The ultimate cloud, fog, screen or curtain comprises a series of particles of opaque, insoluble pigment-like materials intermixed but not in physical contact with the globules of vaporized oils or similar compositions, illustrative examples of which will be hereinafter set forth. These oils and equivalent materials form opaque white particles. As stated, it may be desirable to add further opacity and densifying ingredients such as the compounds set forth in the prior application, but clearly these may be omitted and the mineral base lubricating oil or equivalent material be relied upon to furnish the opaque white globular particles of the smoke screen, and that the pigmenting particles suspended in the opaque white smoke screen in the manner set forth be depended upon to color or tint the smoke screen, giving the effect of a colored cloud.

Referring to the coloring composition such as is introduced into the tank 28, it is desired to state that the volatile solvent of the composition may be any volatile petroleum hydrocarbon such as petroleum ether, ligroin, mixtures of hydrocarbons varying from the pentanes through the octanes, solvent naphtha, V. M. & P. (ordinary painter's naphtha), mineral spirits, cleaner's naphtha, and kerosene.

When a Diesel engine is used as a smoke screen producing apparatus, the volatile solvent may be a mixture of fuel oils and so-called heavy hydrocarbon distillates and related products coming within that range which may be volatilized under the conditions present in Diesel engine exhaust lines. Other types of volatile organic solvents which may be used are coal tar distillates, including benzol, toluol, mixed xylols, coal tar naphthas, hydrogenated solvents of the above mediums; wood distillation solvents including wood and gum turpentine, the terpenes with volatility ranges satisfactory to accomplish the purposes above set forth; and various organic solvents with similar volatility ranges equiva to that of the compounds above set forth, cluding chlorinated hydrocarbons, nitro hy carbons, aldehydes, ketones, esters, amino c pounds, acids, acid amids, imids, and the lil It is also desired to point out that wate also an effective solvent when processed in a manner that it can be made to wet the face of each particle of pigment. This ma; achieved by the addition of a suitable wet agent to the coloring composition presen tank 28, said wetting agent being of a chara which will reduce the surface tension of the w to well under 50 dynes per centimeter. S able wetting agents are the wetting agent s typified by potassium laurate, sodium palm sulphate, and other higher fatty alcohol soc sulphates. Other well known wetting ag may be used in amounts varying between to 50 parts per thousand parts of water. alcohols such as ethyl, methyl, butyl and pr alcohols, and any other alcohols within the missible range of volatility, may be used, these also usually require a wetting agent the satisfactory incorporation and suspensic the pigment.

When it is desirable to produce a jet t smoke, it is of course necessary to use black ments, and for this purpose lamp black, ca black, soot, thermatomic carbon, finely div bone blacks, activated finely ground wood bons, and activated carbons may be used. ther, graphite itself serves very effectively for purpose. When the graphite used is Ach graphite, the tendency to agglomerate into ters or flocs is greatly diminished.

In order to obtain smoke screens of va: colors, said smoke screens being derived compositions one containing a smoke screen and the other containing a pigmenting con nent, it is necessary to incorporate in the c ing component a mixture of different light ored pigments. For example, for a gray sc the composite pigment may comprise a black ment such as carbon black with a white pig such as titanium oxide, zinc oxide, basic carbonate, calcium carbonate or whiting other white pigments recognized as such by paint manufacturing industry. By varying ratio of the black pigment to the white pigr any desired shade of smoke screen may be tained.

For brown screens, the pigment may be t umber, burnt sienna, burnt ochre and the Usually, the colored pigments herein set i form a predominance of the suspended s present in the smoke screen.

To produce a red colored smoke screen, pigments may be Venetian red, red iron o red lead oxide, and various lakes such as para toners.

To produce a green colored screen, the c ing composition introduced into tank 28 will tain as the pigmenting material green chrom or this color may be formed by blending a y( pigment with a blue pigment as, for exan chrome yellow and ultramarine or Prussian The pigmenting materials may be blended in manner which they are blended to produce s factory paint compositions. It is desired to p out that the pigments should not be deleteri( affected by the heat to which they are subj( in internal combustion engines, including Diesel exhaust pipe systems where the temp ture may vary between 500° F. and 800° F In general, it may be stated that the pigmenting composition may vary between 5 to 15% by weight; the flocculating inhibiting agent typified by graphite may vary between 2 and 12%; the viscosity-inducing agent typified by aluminum distearate may vary between 0.5 and 1.5%; and the volatile solvent may vary between 92.5% and 71.5%. Any of the metallic salts of the unsaturated fatty acids having more than twelve carbon atoms may be used as the viscosity-inducing agent present in the coloring composition. The metallic salts of the saturated fatty acids having more than twelve carbon atoms may also be used. The aluminum salts of the higher fatty acids have given the best results as said agents. However, it is desired to clearly point out that there are many viscosity-inducing agents which will function in the manner equivalent to the metallic salts of the higher fatty acids, and that having once pointed out to those skilled in the art the desirability of including in the coloring composition a viscosity-inducing agent, those workers skilled in the art will be able to substitute equivalents for the metallic salts of the saturated and unsaturated fatty acids having more than twelve carbon atoms. A small amount of water may be used as the viscosity-inducing agent, and when using water it is necessary to form a water-in-oil type of emulsion. Any of the ethanol amine soaps may be used as the viscosity-inducing agent, including ethanol amine oleate, stearate and the like. The potassium and ammonium salts of the higher fatty acids may be used. Any amino soap of a fatty acid may also be used as the viscosity-inducing agent.

There has been provided in accordance with the present invention an effective method of incorporating coloring ingredients in the smoke screen base, and there has also been provided a smoke screen wherein the coloring particles are in the form of dry isolated independently suspended particles which are free of any oil coating. The important point is that the pigmenting particles must not be covered with any material which will function to prevent said particles from imparting a color to the smoke screen.

The pigmenting particles are incorporated, as stated, in a suitable volatile or organic solvent in which the particles are completely insoluble, unaffected and capable of being suspended therein. The opacity of the final smoke screen may be regulated by varying the amount of insoluble particles suspended in the smoke screen. While this composition was originally designed to be used in connection with the opaque white screen producing composition set forth in co-pending application, Serial No. 441,550, it is desired to particularly point out that the basic principles of the present invention may be used with other screen forming compositions and, in fact, it is only necessary to first volatilize the smoke screen base such as the lubricating oil or the like, and then separately introduce into said volatilized screen base the pigmented material. The pigmenting particles are admitted into the exhaust manifold exhaust pipe 13 in suspension in a volatile solvent which, in contact with the heated exhaust gases from the engine or with the vapors produced by the cloud generating composition, evaporate completely and to dryness to thereby leave each coloring particle in suspension and well dispersed in the mixed gases. The volatile solvent merely functions as a sustaining agent or vehicle to carry the coloring particles into the vapors present in the screen forming apparatus.

Other examples of compositions which may be used for forming the usual white smoke screen are:

*Example 2*

| | Per cent |
|---|---|
| Lubricating oil | 85 |
| Ceresine wax | 1 |
| Dry ammonium chloride crystals | 14 |

*Example 3*

| | Per cent |
|---|---|
| Lubricating oil | 85.25 |
| Ethyl cellulose (41-44% combined ethoxy-content) | .75 |
| Xylenes | 2 |
| Dibasic ammonium phosphate | 12 |

While the screen producing composition present in tank 26 preferably includes a mineral oil base such as lubricating oil, it is recognized that oily substances such as animal and vegetable fats and oils, petroleum waxes, organic solvents, and crystalline and colloidal masses which are capable of being liquefied at the prevailing temperatures which exhaust in the exhaust manifold of automotive engines, are equally suitable for carrying out the invention. As the screen smoke base, there may be used any type of material which when liquefied will not evaporate in prevailing atmospheric conditions, but will form globules and develop a fog depending upon the mechanics of atomization. More specifically, clouds may be produced from bases such as asphaltum, coal tar pitch, various types of residua from petroleum distillates, tarry residues from the distillation of wood and similar vegetable products, as well as derivatives obtained in the process of both high and low temperature distillation of coals, lignite, peat, as well as the various recognized chemical solvents such as chlorinated hydrocarbons, nitro-hydrocarbons, amino derivatives of the hydrocarbons, ketones, aldehydes, acids, and esters.

While the mineral oil base used in carrying out the present invention may include any of the known types of lubricating oil, it is preferred to use a Gulf Coastal oil which has as its prevailing components a naphthenic base. In the examples herein set forth, this type of oil is referred to. However, other types of petroleum oils may be used such as the mid-continental variety which contains mixed asphaltic and paraffinic bases; the Pennsylvania type of oil having a paraffinic base, and the California type of oil which has an asphalt base. The cyclic oils of Russian origin may also be used equally as well as the Gulf Coastal oils referred to. In one form of the invention, the composition herein set forth may be characterized as being made up of two phases; namely a solid finely divided crystalline material suspended or dispersed in a liquid phase made up of a solution of metallic soap in a petroleum hydrocarbon.

In order that the variations of the composition present in tank 26 may be clearly understood, the disclosure of application, Serial No. 441,550, filed May 2, 1942, is by reference incorporated and made a part of the present application.

It is to be noted that either or both of the smoke screen producing compositions are admitted into the internal combustion engines at a pressure in excess of that of the internal pressure of the gas in the manifold or the exhaust pipe line by an amount sufficient to quickly break up or atomize the fluid mixture, so that the mineral oil base or the equivalent and the volatile solvent of the pigmenting mixture is evaporated into a gas in a very short time interval.

It has been clearly brought out that the most effective method of admitting suitable coloring pigments into the gas in the exhaust pipe line is most effectively achieved by suspending or dispersing the pigment in a liquid medium of such nature that this medium acts as a vehicle or carrier for the pigment up to the point where the mixture of vehicle and pigment is discharged into the exhaust system of the internal combustion engine, at which time the heat and the turbulence of the mixed gas consisting of the products of combustion of the fuel used in such units, said gas usually containing carbon dioxide, steam, carbon monoxide, nitrogen and other gas, quickly converts the vehicle of the pigmenting material into a gas which is mixed with the above referred to products of combustion, and the pigment is suspended in this composite gas mixture, resulting in the coloring of the resulting mass in accordance with the color values of the pigment or pigments which is or are used. It is desired to point out that the screen coloring composition when admitted into the system described at a point distant from the admission of the fog or cloud forming screen results in the coloring of that type of screen to an extent proportionate to the amount of pigment dispersed in the screen aggregate. However, the present invention may be carried out without using the smoke screen composition such as is described as being fed from tank 26. The pigmenting mixture may be fed directly from tank 28 into the exhaust pipe line or other appropriate heating device, and a screen of smoke is readily formed. The introduction of the coloring mixture also results in the deposition of the dispersed pigment in the exhaust atmosphere, and this dispersion is maintained when the exhaust atmosphere with the suspended pigment passes from the exhaust pipe line into the atmosphere, the resulting screen being colored in accordance with the color values of the pigment used. The opacity or density of a color screen produced as above set forth is a function of the amount or the number of pigments prevailing in any unique volume of gas and atmosphere.

In co-pending application, Serial No. 441,550, there is disclosed a screen made up of a vaporized or gasified oil in conjunction with a volatile organic or inorganic compound which has been sublimed into solid crystalline particles, while the oil exists in the form of a mist, fog or vapor. Due to the difference of the refractive index of the oil or other smoke screen base as compared to that of the atmosphere, an opaque white screen results due primarily to the oil globules. When ammonium chloride is used to furnish the dry particles of inorganic salt which later on sublimes, these sublimed ammonium chloride crystals contribute toward the whiteness and opacity of the screen and at the same time increase its density, thereby substantially contributing toward the holding of the screen close to the ground or other surface upon which it is cast or formed. When the herein described pigmenting mixture is ejected into a fog produced as above, or with equivalent materials such as set forth in the present specification or in application Serial No. 441,550, the coloring pigments exist as independent solid particles dispersed and suspended in the mass. The coloring pigments contribute substantially to increase the opacity and the density of the screen formed, resulting in increased permanence. It is desired to point out that a smoke screen may be formed without the coloring agent from atomized oil, ammonium chloride, and the like, or that a smoke screen may be formed using the pigmenting mixture as herein set forth. However, it has been observed that by forming a smoke screen from compositions such as the vaporized oil mist augmented by the introduction of pigmentary particles in accordance with the method above set forth, produces a composite smoke screen of greatly increased value from the aspect of density, permanence and opacity, as well as color.

When the coloring composition such as described as fed from the tank 28 is formed into a screen, there is produced a smoke consisting of particles of the colored pigment dispersed in the atmosphere. While a single pigment may be used in the formation of this smoke type of screen, there are certain pigments as pointed out which from the nature of the particles tend to agglomerate into larger masses or flocs. While mechanical means may be used to inhibit this agglomeration, such as vigorous agitation or trituration between two moving surfaces separated by the particle itself, it is best to introduce into the pigmenting mixture another type of particle, the surfaces of which are exceedingly smooth and non-adherent either to itself or other surfaces, thereby preventing the herein described agglomerate formation. In addition to the materials herein set forth, the several varieties of the natural magnesium silicate hydrates may be used. The floc inhibiting medium of the present invention does not itself agglomerate because each particle thereof presents a smooth non-binding surface, and in fact acts as a lubricant for that type of pigment particles which would otherwise tend to floc. As stated, not all pigments possess this tendency, but many do as, for example, lamp black which usually contains some oil, and other adhesive surface products. It is desired to point out that the pigmenting material is usually reduced in size to about one micron or less in order that its coloring effectiveness may be increased.

The following are further examples of suitable pigmenting compositions which may be fed from tank 28.

*Example 4*

| | Parts by wt |
|---|---|
| Powdered burnt sienna | per cent__ 14 |
| Powdered talc | do____ 5 |
| Toluene | do____ 80.2 |
| Calcium palmitate | do____ .8 |

The above composition produces a brown screen.

A gray smoke screen may be produced from the following composition:

*Example 5*

| | Parts by wt. |
|---|---|
| Carbon black | per cent__ 6 |
| Calcium carbonate | do____ 12 |
| Graphite | do____ 4 |
| Coal tar naphtha | do____ 50 |
| Turpentine | do____ 26.6 |
| Ethyl cellulose (41–45% ethoxy content) | per cent__ 1.2 |

The above composition may be used independently of the composition which is usually introduced through tank 26 to produce a gray smoke, the color of the smoke being formed by a combination of black and white pigmenting particles.

The graphite in the composition functions as a coloring agent as well as a floc inhibiting agent.

The carbon black furnishes the black particles of the mixed screen.

It is to be noted that in the composition set forth in Example 5, the pigmenting particles are suspended in a volatile organic mixture comprising coal tar naphtha and turpentine, the function of the solvent mixture being to obtain the desired rate of evaporation by the blending of two solvents of different boiling ranges. It is desirable that the solvent, as soon as it is injected in the exhaust atmosphere volatilize into a gas and free the pigmenting particles in independent dry form. It is important that when the organic solvent in which the pigmenting particles are suspended is introduced into the exhaust gas or equivalent medium, no substantial quantity of mist be produced because if a mist is produced, the pigmenting particles will be enclosed in a film of liquid which will wet the surface of each particle and when this is done, the so wetted particles lose their color value in the screen and the pigment no longer functions as a coloring agent. The point is that when producing a colored screen, the color imparting pigmenting particles must exist in the form of dry isolated particles suspended in the exhaust gas coming from an automotive engine and ultimately suspended in the atmosphere. When any of the coloring compositions herein set forth are introduced into a gaseous smoke screen composition in the manner herein set forth, it is also important when a color screen is produced that the coloring particles exist in said screen in the form of dry isolated particles suspended in the single or composite gaseous mixture of the screen.

It is to be noted that the composition in Example 5 contains a small percentage of ethyl cellulose. This material acts as a viscosity-inducing agent for the composition. In other words, it prevents the solid ingredients of the composition from settling and packing at the bottoms of the containers in which the liquid composition is stored. At the temperature of the exhaust gas, the ethyl cellulose is carbonized into black particles. If the metallic soaps of the fatty acids are used as viscosity-inducing agents at the temperature of the exhaust gas, the metallic soaps dry out to small white particles.

In the preferred form of the invention, the mist forming composition disclosed in application Serial Nos. 441,550 and 441,724, which composition is usually introduced into the smoke producing apparatus from tank 26, is preferably admitted to the smoke producing apparatus at a point prior to the opening of the exhaust ports, in view of the great amount of heat energy available in the exhaust gas, together with a turbulent effect created by the passage of a gas over the open exhaust ports. The coloring composition is preferably introduced into the exhaust line beyond the manifold because this area is somewhat cooler and because of the fact that the coloring composition requires less energy for its conversion into a smoke. However, approximately similar results may be obtained by reversing the points of admission of the respective compositions. The primary precaution to be observed is that the two compositions must be converted by heat energy prior to their admixture, and so it becomes necessary to regulate or space the points of admission of the compositions in such juxtaposition that the above described physical conditions prevail.

The smoke screen apparatus herein set forth is claimed in copending application Serial No. 441,724.

What is claimed is:

1. The method of developing a colored smoke screen comprising suspending solid inert pigment particles which maintain their predetermined pigment properties at temperatures varying between 500° and 800° F. in a volatile liquid capable of ready gasification on the application of heat with substantially no residue, said pigment particles being substantially insoluble in said volatile liquid, heating said mixture to gasify said liquid and form dry particles of pigment, and simultaneously subjecting the dry particles of pigment to the action of a moving gas containing gasified particles of a smoke screen base inhibiting the wetting of the dry pigment particles, said gasified particles condensing on contact with the atmosphere, said moving gas and its gasified particles of the smoke screen base having a different color from that of the predetermined color of the pigment particles, said pigment particles upon incorporation in said gas forming a smoke screen in which the pigment particles maintain their predetermined color value and impart said color value to the smoke screen.

2. The method of developing a colored smoke screen comprising suspending in a volatile liquid capable of ready gasification on the application of heat with substantially no residue, a mixture of solid inert pigment particles which maintain their predetermined pigment properties at temperatures varying between 500° and 800° F. and which tend to agglomerate into a floccular mass, together with a solid material the particles of which have surfaces which are smooth and non-adherent to each other and to other surfaces, said latter particles acting to inhibit flocculation of the pigment particles on volatilization of said volatile liquid, said pigment particles being substantially insoluble in said volatile liquid, heating the mixture of solid particles and volatile liquid to gasify said liquid and form dry particles of pigment, and simultaneously subjecting the dry particles of pigment to the action of a moving gas containing gasified particles of a smoke screen base inhibiting the wetting of the dry pigment particles, and which condenses on contact with the atmosphere, said moving gas and its gasified particles of the smoke screen base having a different color from that of the predetermined color of the pigment particles, said pigment particles upon incorporation in said gas forming a smoke screen in which the pigment particles maintain their predetermined color value and impart said color value to the smoke screen.

3. The method of developing a colored smoke screen comprising suspending solid inert pigment particles which maintain their predetermined pigment properties at temperatures varying between 500° and 800° F. in a volatile liquid capable of ready gasification on the application of heat with substantially no residue, said pigment particles being substantially insoluble in said volatile liquid, heating said mixture to gasify said liquid and form dry particles of pigment, and simultaneously subjecting the dry particles of pigment to the action of a flowing stream of a dense opaque white smoke screen comprising a mixture of the hot exhaust gases from an internal combustion engine and the gasified particles of a smoke screen base capable of being volatilized and maintained in its volatilized state at a temperature between 300° and 800° F., said gasified particles of the smoke screen base inhibiting the wetting of the dry pigment particles, said gasified particles of the smoke screen base condensing on contact with the atmosphere, said pigment particles upon incorporation in said opaque white smoke screen maintaining and imparting their predetermined color value to the smoke screen.

4. The method of claim 3 in which the smoke screen base is a hydrocarbon oil.

5. The method of developing a smoke screen comprising suspending in a volatile liquid capable of ready gasification on the application of heat with substantially no residue, a mixture of solid inert pigment particles which maintain their predetermined properties at a temperature varying between 500° and 800° and which tend to agglomerate into a floccular mass, together with a solid material the particles of which have surfaces which are smooth and non-adherent to each other and to other surfaces, said latter particles acting to inhibit flocculation of the pigment particles on volatilization of said volatile liquid, said pigment particles being substantially insoluble in said volatile liquid, heating the mixture of solid particles and volatile liquid to gasify said volatile liquid and form dry particles of pigment, and simultaneously subjecting the dry particles of pigment to the action of a flowing stream of a dense opaque white smoke screen comprising a mixture of the hot exhaust gases from an internal combustion engine and the gasified particles of a smoke screen base capable of being volatilized and maintained in its volatilized state at a temperature between 300° and 800° F., said gasified particles of the smoke screen base inhibiting the wetting of the dry pigment particles, said gasified particles of the smoke screen base condensing on contact with the atmosphere, said pigment particles upon incorporation in said opaque white smoke screen maintaining and imparting their predetermined color value to the smoke screen.

6. The method of developing a smoke screen comprising suspending in a volatile liquid capable of ready gasification on the application of heat with substantially no residue, a mixture of solid inert pigment particles which maintain their predetermined properties at a temperature varying between 500° and 800° F. and which tend to agglomerate into a floccular mass, and graphite acting to inhibit flocculation of the pigment particles on volatilization of said volatile liquid, said pigment particles being substantially insoluble in said volatile liquid, heating the mixture of solid particles and volatile liquid to gasify said volatile liquid and form dry particles of pigment, and simultaneously subjecting the dry particles of pigment to the action of a flowing stream of a dense opaque white smoke screen comprising a mixture of the hot exhaust gases from an internal combustion engine and the gasified particles of a smoke screen base capable of being volatilized and maintained in its volatilized state at a temperature between 300° and 800° F., said gasified particles of the smoke screen base inhibiting the wetting of the dry pigment particles, said gasified particles of the smoke screen base condensing on contact with the atmosphere, said pigment particles upon incorporation in said opaque white smoke screen maintaining and imparting their predetermined color value to the smoke screen.

7. The method of claim 6 in which the smoke screen base is a hydrocarbon oil.

8. A smoke-producing composition comprising a pigment material the particles of which tend to agglomerate into a floccular mass on being subjected to heat of the order of that generated in an internal combustion engine, a volatile liquid capable of ready gasification on the application of heat with substantially no residue, said particles of pigment material being substantially insoluble in said volatile liquid, and a solid material the particles of which have surfaces which are smooth and non-adherent to each other and to other surfaces, said latter particles acting to inhibit flocculation of the pigment particles on volatilization of said volatile liquid and the introduction of the particles into a gaseous smoke screen mass.

9. A smoke-producing composition comprising a pigment material the particles of which tend to agglomerate into a floccular mass on being subjected to heat of the order of that generated in an internal combustion engine, a volatile liquid capable of ready gasification on the application of heat with substantially no residue, said particles of pigment material being substantially insoluble in said volatile liquid, and graphite acting to inhibit flocculation of the pigment particles on volatilization of said volatile liquid and the introduction of the particles into a gaseous smoke screen mass.

10. The method of developing a colored smoke screen comprising providing a volatile liquid carrier having present ethyl cellulose which increases the viscosity of said volatile liquid carrier, said volatile liquid being capable of ready gasification on the application of heat with substantially no residue, suspending in said liquid carrier a mixture of solid inert pigment particles which maintain their predetermined pigment properties at temperatures varying between 500° and 800° F. and which tend to agglomerate into a floccular mass, together with a solid material the particles of which have surfaces which are smooth and non-adherent to each other and to other surfaces, said latter particles acting to inhibit flocculation of the pigment particles on volatilization of said volatile liquid, said pigment particles being substantially insoluble in said volatile liquid, heating the mixture of solid particles and volatile liquid carrier to gasify said liquid and form dry particles of pigment, and simultaneously subjecting the dry particles of pigment to the action of a moving gas containing gasified particles of a smoke screen base inhibiting the wetting of the dry pigment particles, and which condenses on contact with the atmosphere, said moving gas and its gasified particles of the smoke screen base having a different color from that of the predetermined color of the pigment particles, said pigment particles upon incorporation in said gas forming a smoke screen in which the pigment particles maintain their predetermined color value and impart said color value to the smoke screen.

HAROLD A. LEVEY.